April 18, 1967 R. W. RAINS 3,314,102
APPARATUS FOR ELECTRICALLY STUNNING ANIMALS
Filed July 1, 1965 2 Sheets-Sheet 2

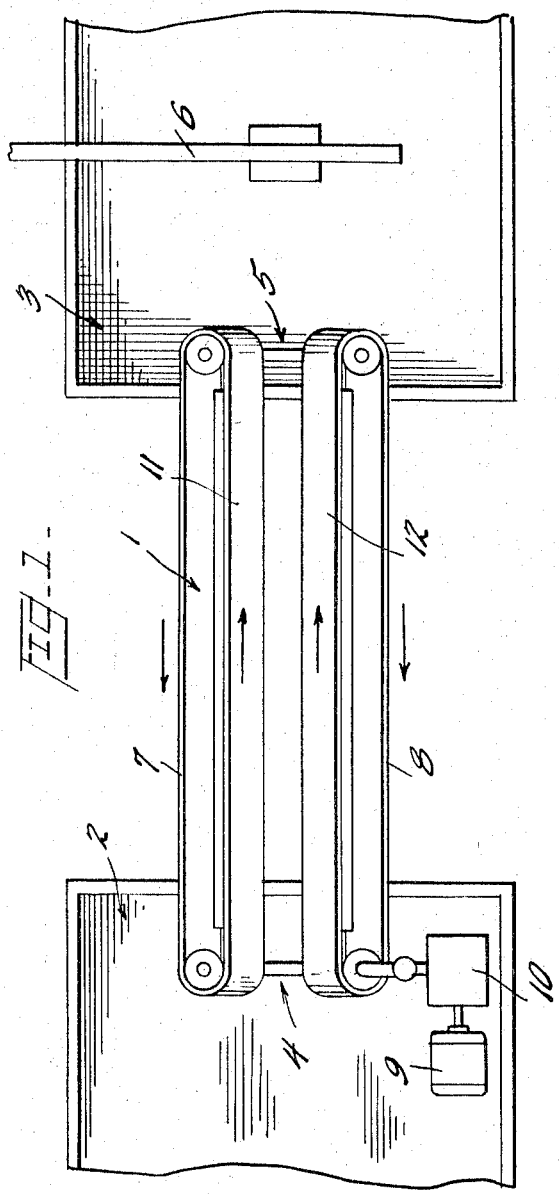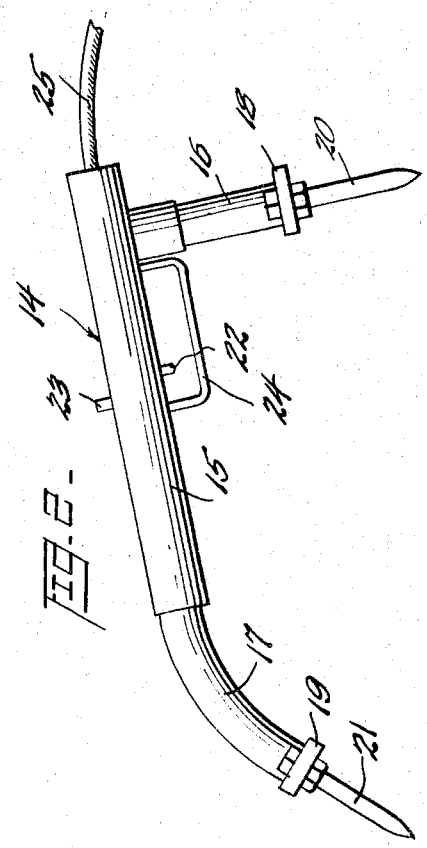

INVENTOR
Richard W. Rains,

BY John B. Dickman III
AGENT

United States Patent Office 3,314,102
Patented Apr. 18, 1967

3,314,102
APPARATUS FOR ELECTRICALLY STUNNING ANIMALS
Richard W. Rains, Timonium, Md., assignor to Schluderberg-Kurdle Co., Inc., Baltimore, Md., a corporation of Maryland
Filed July 1, 1965, Ser. No. 468,695
3 Claims. (Cl. 17—1)

This invention relates generally to a slaughtering apparatus for use in connection with the slaughtering of livestock such as hogs, cattle and sheep. More specifically the invention relates to an apparatus for delivering animals to a slaughtering station and for the electrical stunning of animals, just prior to the bleeding thereof, to render them unconscious and insensitive to pain. The apparatus of the invention, which is designed for use in slaughtering houses where large numbers of animals are successively slaughtered, includes means by which the delivery of animals to a slaughtering station, and the stunning thereof, is controlled in timed relation to the bleeding of successive animals at the stunning station. The apparatus is especially adapted for utilizing the the method of stunning animals which is disclosed in my co-pending application Ser. No. 468,696 which was filed concurrently herewith. The invention is shown and described herein in connection with the stunning and slaughtering of hogs, but it is equally well adapted for use in the stunning and slaughtering of cattle and sheep.

In accordance with the invention hogs are successively delivered from a loading station to a slaughtering station by a motor driven conveyor having the discharge end thereof disposed in position to discharge a hog therefrom onto a receiving platform at the slaughtering station. At the slaughtering station the hogs are suspended head down from an overhead conveyor and their jugular veins cut after which they are conveyed away from the slaughtering station for butchering. As a hog approaches the discharge end of the conveyor at the slaughtering station the conveyor is stopped until the slaughterer completes the slaughtering of a previously delivered hog and is ready for the slaughtering of the next hog.

During the dwells in the movement of the conveyor a stunning voltage is applied to the hog at the discharge end of the conveyor to render it unconscious so that it will be insensitive to pain during the bleeding thereof. The stunning voltage is applied to the hogs through an applicator having a pair of electrodes, which are secured in longitudinally spaced relation to each other, to a body or handle member. One electrode is adapted for application to the head of an animal, and the other electrode is adapted for application to the back of the animal. Thus a voltage applied to the electrodes will pass between the electrodes through the brain and back of an animal. The stunning voltage potential is such that it will render an animal unconscious but will not stop the heart action thereof which is essential for the proper bleeding of the animal. A low voltage tranquilizing current, which soothes and pacifies an animal, is first applied to an animal at the discharge end of the conveyor during the entire dwell period of the conveyor while waiting for the completion of the slaughtering of an animal just previously delivered to the slaughtering station, and then when the slaughterer is ready for the next animal a high voltage stunning current is applied to the animal for a few seconds, after which the conveyor is automatically started to discharge the stunned animal therefrom and to advance the next animal up to the end of the conveyor. The foregoing operation is repeated for each successive animal delivered from the loading station to the slaughtering station. The successive applications of tranquilizing and stunning voltages to an animal are controlled by an operator through a pair of manually actuated switching mechanisms which are mounted on the applicator handle. The operation of the conveyor is automatically controlled, through suitable inter-connected mechanism, by the application of the tranquilizing and stunning voltages to the animal in timed relation thereto. The application of the tranquilizing voltage to the animal effects the stopping of the conveyor, and the termination of the application of the stunning voltage to the animal effects the starting of the conveyor.

One of the objects of the invention is to provide an apparatus which is especially adapted for utilizing a method of stunning animals, preparatory to the slaughtering thereof, which comprises first applying a low voltage tranquilizing current thereto and then applying a high voltage stunning current thereto, such as disclosed and claimed in my aforesaid co-pending application Ser. No. 468,696.

Another object of the invention is to provide an apparatus of the aforesaid character in which the operation of a conveyor, by which animals are successively delivered to a slaughtering station, is automatically controlled by and in timed relation to the application of the tranquilizing and stunning voltages thereto.

Still another object of the invention is to provide an apparatus of the aforesaid character which is of simple construction and is very efficient in operation.

Having stated the principal objects of the invention, other and more specific objects thereof will be apparent from the following specification and the accompanying drawings forming a part thereof in which:

FIG. 1 is a diagrammatic plan view of a conventional animal slaughtering layout showing the relative arrangement of a corral and a slaughtering station and a connector conveyor on which animals are delivered from the corral to the slaughtering station;

FIG. 2 is a side elevation of one type of applicator through which stunning voltages are applied to animals as they are being delivered to the slaughtering station.

Figure 3:
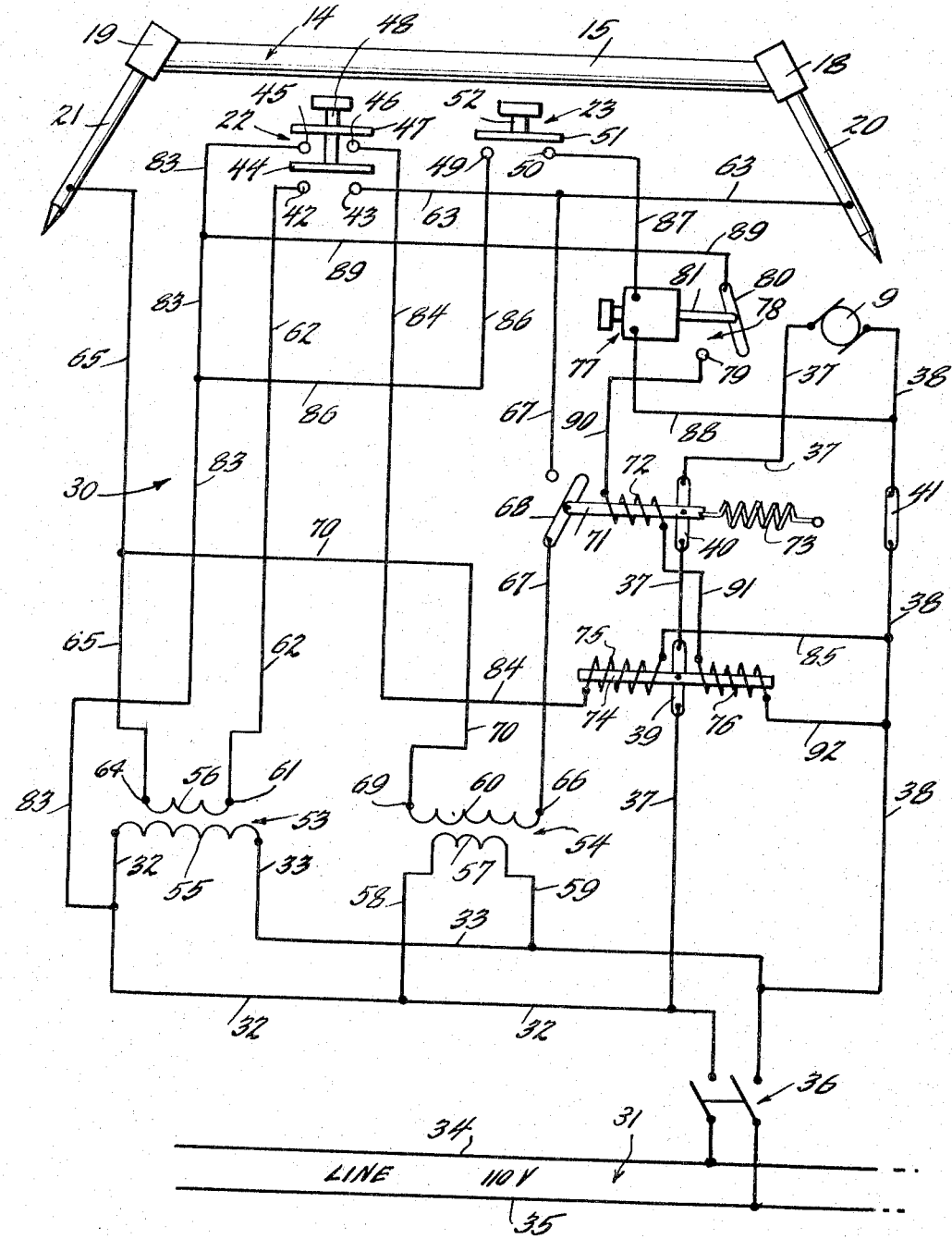
FIG. 3 is a diagrammatic layout of the control mechanism by which the stunning voltages applied to animals and the operation of the conveyor are effected and controlled in timed relation to each other.

Having generally described the construction and operation of the slaughtering apparatus of the invention, it will now be specifically described in connection with the drawings by the use of reference characters in which the numeral 1 indicates generally a conveyor by which animals are successively delivered from a corral 2 to a slaughtering station 3. The rear loading end 4 of the conveyor is disposed within the corral 2, and the forward discharge end 5 thereof is disposed in position to discharge animals therefrom to the slaughtering station 3. At the slaughtering station the animals are suspended head down from an overhead conveyor 6 during slaughtering and are conveyed away from the slaughtering station thereby after bleeding.

The conveyor 1, which is of conventional construction, comprises a pair of similar spaced parallel units 7 and 8 which are driven in unison with each other by a motor 9 through a gear box 10. The opposed inner flights 11 and 12 of the conveyor units 7 and 8 are inclined downwardly and inwardly toward each other. The opposed flights 11 and 12 grip the sides of animals being conveyed to the slaughtering station with the legs of the animals extending downwardly between the lower edges of the flights.

As animals approach the discharge end 5 of the conveyor, and during the time they are held there awaiting the completion of the slaughtering of the animal just previously delivered to the slaughtering station, a relatively low tranquilizing voltage is applied thereto; and just prior to the discharge of the animal from the conveyor to the slaughtering station a relatively high stunning voltage is applied thereto. The method of stunning animals prior to slaughtering by first applying a relatively low voltage thereto, which soothes and pacifies the animal, for an indefinite length of time, and then applying a relatively high voltage thereto, which stuns and renders the animal unconscious, for a predetermined length of time, does not comprise a part of the present invention but constitutes the subject matter of my co-pending application Ser. No. 468,696 which was filed concurrently herewith.

The tranquilizing and stunning voltages are imparted to the animals through an applicator, generally indicated by the numeral 14, such as shown in FIG. 2, which is adapted to be manually applied to the head and back of animals while they are at the discharge end 5 of the conveyor 1. The applicator 14 comprises an elongated tubular body or handle member 15, having a straight downwardly extending arm 16 secured thereto adjacent the rear end thereof, and a forwardly and downwardly extending arcuate arm 17 secured to the forward end thereof. A block 18, of insulating material, is secured to the lower end of the arm 16, and a similar block 19 of insulating material is secured to the lower end of the arm 17. An elongated cylindrical metal electrode 20 is secured to and extends downwardly from the block 18, and a similar electrode 21 is secured to and extends downwardly from the block 19. A pair of normally open switches 22 and 23 of the push button type, which are adapted to be manually actuated, are mounted in the handle member 15. A finger guard 24 is secured to the underside of the handle member 15 adjacent the arm 16. The electrodes 20 and 21 are adapted to be selectivley connected between the terminals of either a low or a high voltage source by conductors which are disposed within the tubular handle 15 and arms 16 and 17 and extend out therefrom in a cable 25. In use the electrode 20 is applied to the head of an animal and the electrode 21 is applied to the back of the animal. Current will then flow from one terminal of a voltage source to the electrode 20, thence through the brain and back of the animal to the electrode 21, and from there to the other terminal of the voltage source, as will be explained in detail hereinafter. The applicator 14, per se, forms no part of the present invention but constitutes the subject matter of my co-pending application Ser. No. 468,694, filed concurrently herewith. Consequently, it is not being shown and described in more detail herein.

The control mechanism, generally indicated by the numeral 30, by which the tranquilizing and stunning voltages are applied to animals through the applicator 14, and the operation of the conveyor drive motor 9 are effected and controlled in sequentially timed relation with respect to each other, will now be described in connection with FIG. 3. The mechanism 30 and the conveyor motor 9 are connected to a commercial 110 v. line 31 through a pair of conductors 32 and 33 which are connected to the sides 34 and 35 respectively of the line 31. A double pole master control switch 36 is interposed in the conductors 32 and 33. The motor 9 is connected between a pair of conductors 37 and 38 which are connected to the conductors 32 and 33 respectively. The conductor 37 has a pair of automatically actuated switches 39 and 40 interposed therein in series with each other and the conductor 38 has a normally closed manually actuated switch 41 interposed therein which is preferably located at the corral 2.

The push button switch mechanism 22, which is mounted on the applicator 14, comprises a pair of contacts 42 and 43 and a bridging bar 44 therefor, and a pair of contacts 45 and 46 and a bridging bar 47 therefor. The bridging bars 44 and 47 are both mounted upon a common plunger 48 for actuation in unison. The push button switch 23, also mounted on the applicator 14, comprises a pair of spaced contacts 49 and 50 and a bridging bar 51 therefor which is mounted on a plunger 52.

The tranquilizing voltage source comprises a step-down transformer 53 by which the line voltage 31 is reduced to a relative low voltage, and the stunning voltage source comprises a step-up transformer 54 by which the line voltage 31 is increased to a relatively high voltage. The step-down transformer 53 comprises a primary winding 55, which is connected between the conductors 32 and 33, and a secondary winding 56. The step-up transformer 54 comprises a primary winding 57, which is connected between the conductors 32 and 33 and by a pair of branch conductors 58 and 59, and a secondary winding 60.

The positive terminal 61, of the secondary winding 56 of the step-down transformer 53, is connected to the contact 42 of the switching mechanism 22 by a conductor 62; and the contact 43 of the switching mechanism 22 is connected to the electrode 20 of the applicator 14 by a conductor 63. The terminal 64 of the secondary winding 56, of the step-down transformer 53, is connected to the electrode 21 of the applicator 14 by a conductor 65.

The terminal 66, of the secondary winding 60 of the step-up transformer 54, is connected to the electrode 20 of the applicator 14 by a conductor 67, having a switch 68, which is normally yieldingly biased to circuit breaking position by a spring 73, interposed therein, and the conductor 63; and the terminal 69 of the secondary winding 60 is connected to the electrode 21 of the applicator 14 by a conductor 70 and the conductor 65.

An armature 71, having a relay coil 72 operatively associated therewith, is connected to and between the switches 40 and 68 in such a manner that when the switch 40, in the conveyor motor 9 circuit, is in circuit closing position the switch 68 in the stunning high voltage circuit will be in circuit breaking position, and reversely when the switch 40 is in circuit breaking position the switch 68 will be in circuit closing position. The coil 72 is operative when energized to actuate the armature 71 to move the switch 68 from circuit breaking position to circuit closing position and to simultaneously move the switch 40 from circuit closing position to circuit breaking position. The spring 73 is operative to move the switch 68 back from circuit closing position to circuit breaking position, and to simultaneously move the switch 40 back from circuit breaking position to circuit closing position upon the relay coil 72 being de-energized.

The switch 39, which is interposed in the conveyor motor 9 circuit in series with the switch 40 therein, is connected to an armature 74 having the relay coils 75 and 76 operatively associated therewith. The coil 75 is operative when energized to actuate the armature 74 to move the switch 39 from circuit closing position to circuit breaking position, and the coil 76 is operative, when energized, to move the switch 39 back from circuit breaking position to circuit closing position. The energization of the relay coil 75 is controlled by the switching mechanism 22, and the energization of the relay coils 72, and 76 is controlled by the push button switch 23 through a time control unit 77 and a switch 78. The switch 78 comprises a contact 79 and a pivoted arm 80 which is adapted to be swung back and forth into and out of engagement with the contact 79 by the time control unit 77 through a connecting link 81. The time control unit 77, which is of conventional construction, is operative when momentarily energized to swing the arm 80 into engagement with the contact 79, and after a set predetermined length of time to automatically swing the arm 80 back out of engagement with the contact 79.

The contact 45 of the switching mechanism 22 is connected to the conductor 32 by a conductor 83, and the contact 46 thereof is connected to one end of the relay coil 75 by a conductor 84. The other end of the coil 75 is connected to the conductor 38 by a conductor 85. The contact 49 of the push button switch 23 is connected to the conductor 83 by a branch conductor 86; and the contact 50 of the switch 23 is connected to one side of the time control unit 77 by a conductor 87. The other side of the control unit 77 is connected to the conductor 38 by a conductor 88. The switch arm 80 of the switch 78 is connected to the conductor 83 by a conductor 89, and the contact 79 of the switch 78 is connected to one end of the relay coil 72 by a conductor 90. The other end of the coil 72 is connected to one end of the coil 76 by a conductor 91, and the other end of the coil 76 is connected to the conductor 38 by a conductor 92.

The operation of the apparatus will now be described in connection with FIG. 3 of the drawings, it being assumed that switches 36, 39, 40 are in closed circuit making position, and that switches 22, 23, 68 and 78 are in open circuit breaking position. Current is therefore flowing from the conductor 32 through the conductor 37 and the closed switches 39 and 40 therein, to the conveyor motor 9, and from the motor 9 back to the conductor 33 through the conductor 38 and the switch 41 interposed therein. The motor 9 is therefore energized and is driving the conveyor 1 to advance an animal thereon from the corral 2 to the slaughtering station 3. As the animal approaches the discharge end 5 of the conveyor the operator manually closes the switch mechanism 22, and then applies the applicator to the animal with the electrode 20 in electrical contact with the animal's head and the electrode 21 in electrical contact with the animals back. Current will then flow from the conductor 32 through the conductor 83 to the contact 45, through the bridging bar 47 to the contact 46, and from the contact 46 through the conductor 84 to the relay coil 75, and from the coil 75 back to the conductor 33 through the conductors 85 and 38. The coil 75 will thereby be energized and actuate the armature 74 to move the switch 39 to open circuit breaking position, thereby deenergizing the motor 9 and stopping the movement of the conveyor. The low voltage tranquilizing current induced in the secondary winding 56 of the step-down transformer 54, by the closing of the switch mechanism 22, will flow from the terminal 61 of the secondary winding 56 through the conductor 62 to the contact 42, through the bridging bar 44 to the contact 43, and from the contact 43 through the conductor 63 to the electrode 20. From the electrode 20 the current will flow through the brain and back of the animal to the electrode 21, and from the electrode 21 through the conductor 65 back to the terminal 64 of the secondary winding 56. As long as the switch mechanism 22 is maintained closed the switch 39 in the motor 9 circuit will remain in open circuit breaking position, whereby the conveyor 1 will be maintained stationary, and the tranquilizing voltage will flow between the electrode 20 and the electrode 21 through the brain and back of the animal.

When it is time to apply the relatively high stunning voltage to the animal the switching mechanism 22 is released and the switch 23 momentarily closed and released. When the switch 23 is closed current will flow from the conductor 32 to the contact 49 through the conductors 83 and 86, through the bridging bar 51 to the contact 50 and from the contact 50 through the conductor 87 to the time control device 77, and from the time control device back to the conductor 33 through the conductors 88 and 38, thereby energizing the time control device 77. The control device 77, being energized, will, through the link 81, move the switch arm 80 of the switch 78 into engagement with the contact 79 thereof. Current will then flow from the conductor 32 to the switch arm 80 through the conductors 83 and 89, through the arm 80 to the contact 79, from the contact 79 through the conductor 90 to one terminal of the relay coil 72, through the coil 72, from the other terminal of the coil 72 to one terminal of the relay coil 76, through the coil 76, and from the other terminal of the coil 76 back to the conductor 33 through the conductors 92 and 38, thereby energizing the relay coils 72 and 76 which are disposed in series with each other. The relay coil 72 being energized will actuate the armature 71 to move the switch 40 out of circuit making position into circuit breaking position, and the switch 68 from circuit breaking position to circuit making position; and the relay coil 76 being energized will actuate the armature 74 to move the switch 39 from circuit breaking position back to circuit making position, simultaneously with the movement of the switch 40 to circuit breaking position. The motor 9 will therefore remain de-energized and the conveyor 1 stationary. The switch 68 being in circuit making position the relatively high stunning voltage current will flow from the terminal 66 of the secondary winding 60 of the step-up transformer 54 through the conductors 67 and 63 to the electrode 20, through the brain and back of the animal to the electrode 21, and from the electrode 21 back to the terminal 69 of the secondary winding 60 through the conductors 65 and 70. After a set predetermined length of time the time control device 77 will automatically actuate the link 81 to move the switch arm 80 out of engagement with the contact 79 thereby breaking the circuit to the relay coils 72 and 76. The spring 73, connected to the armature 71, will then return the switch 40 to circuit making position and the switch 68 to circuit breaking position, thereby energizing the motor 9 and terminating the application of the stunning voltage to the animal. The motor 9 being energized will drive the conveyor 1 to discharge the stunned animal from the discharge end 5 of the conveyor to the slaughtering station 3 and to deliver the next animal from the corral 2 to the slaughtering station 3. The operation just described will be repeated for each successive animal delivered from the corral 2 to the slaughtering station 3.

From the foregoing it will be apparent to those skilled in this art that I have provided a very simple and efficient apparatus for accomplishing the objects of the invention; and it is to be understood that I am not limited to the specific construction shown and described herein as various modifications may be made therein within the spirit of the invention and the scope of the appended claims.

What is claimed is:

1. A slaughtering apparatus of the character described comprising: a conveyor by which animals are successively delivered to a slaughtering station; an electric motor by which said conveyor is driven; a first electrode which is adapted to be placed in electrical contact with the head of an animal and a second electrode which is adapted to be placed in electrical contact with the back of an animal in spaced relation to said first electrode; a low voltage source, and a high voltage source; a motor circuit by which said motor is connected between the opposite sides of a power line, switching means interposed in said motor circuit; a low voltage circuit by which said first and second electrodes are connected between the terminals of said low voltage source, a high voltage circuit by which said first and second electrodes are connected between the terminals of said high voltage source, and a switch interposed in said high voltage circuit; a normally open manually actuated switching mechanism which is operative when closed to close said low voltage circuit and to effect the actuation of said switching means to open the said motor circuit and thereby de-energize said motor; power means which is operative when energized to actuate said switch to close the said high voltage circuit between said high voltage source and said electrodes and when subsequently de-energized to actuate said switch to open said high voltage circuit and simultaneously actuate said switching means to close said motor circuit and thereby energize said motor; control means which is operative when momentarily energized to effect the energization and the subsequent de-energization of said power means; and a manually actuated switch which is operative when closed to effect the energization of control means.

2. A slaughtering apparatus as defined by claim 1 in which said low voltage source comprises a step-down transformer having a primary winding and a secondary winding and said high voltage source comprises a step-up transformer having a primary winding and a secondary winding, and in which the primary windings of said step-down and said step-up transformers are connected between the positive and negative sides of a power line by a pair of conductors having a double pole master control switch interposed therein.

3. A slaughtering apparatus as defined by claim 1 in which said control means comprises a normally open switch and an adjustable timer operatively connected thereto.

References Cited by the Examiner

UNITED STATES PATENTS

| 3,051,984 | 9/1962 | Hlavacek et al. | 17—1 |
| 3,122,776 | 3/1964 | Root | 17—1 |
| 3,152,357 | 10/1964 | Wemmer | 17—1 |
| 3,167,809 | 2/1965 | Rollins | 17—1 |

OTHER REFERENCES

Schermer et al.: German application No. 1,144,145 (1 sheet dwg., 2 pages spec.), published Feb. 21, 1963.

LUCIE H. LAUDENSLAGER, *Primary Examiner.*